US010664426B2

(12) United States Patent
Lee et al.

(10) Patent No.: US 10,664,426 B2
(45) Date of Patent: May 26, 2020

(54) ELECTRONIC DEVICE AND METHOD FOR PERFORMING HYBRID COMMUNICATION WITH EXTERNAL ELECTRONIC DEVICE

(71) Applicant: Samsung Electronics Co., Ltd., Gyeonggi-do (KR)

(72) Inventors: Woo Kwang Lee, Gyeonggi-do (KR); Kyoung Hoon Kim, Seoul (KR); Bo Ram Namgoong, Seoul (KR)

(73) Assignee: Samsung Electronics Co., Ltd (KR)

( * ) Notice: Subject to any disclaimer, the term of this patent is extended or adjusted under 35 U.S.C. 154(b) by 25 days.

(21) Appl. No.: 15/130,200

(22) Filed: Apr. 15, 2016

(65) Prior Publication Data
US 2016/0306762 A1    Oct. 20, 2016

(30) Foreign Application Priority Data

Apr. 15, 2015    (KR) ........................ 10-2015-0053051

(51) Int. Cl.
*G06F 13/42* (2006.01)
*G06F 13/38* (2006.01)
(Continued)

(52) U.S. Cl.
CPC .......... *G06F 13/385* (2013.01); *G06F 3/1423* (2013.01); *G06F 3/1454* (2013.01); *G06F 9/4413* (2013.01); *G06F 9/452* (2018.02); *G06F 13/4022* (2013.01); *G06F 13/4282* (2013.01); *H02J 50/10* (2016.02); *H02J 50/80* (2016.02); *G09G 2340/02* (2013.01); *G09G 2340/0407* (2013.01); *G09G 2340/0442* (2013.01); *G09G 2360/04* (2013.01); *G09G 2370/16* (2013.01)

(58) Field of Classification Search
None
See application file for complete search history.

(56) References Cited

U.S. PATENT DOCUMENTS 8,538,324 B2    9/2013    Hardacker et al.
8,560,704 B2    10/2013    Chang et al.
(Continued)

FOREIGN PATENT DOCUMENTS

| EP | 2 770 645 | 8/2014 |
|---|---|---|
| EP | 2 782 211 | 9/2014 |
| KR | 1020140076486 | 6/2014 |

OTHER PUBLICATIONS

European Search Report dated Jul. 28, 2016 issued in counterpart application No. 16165564.2-1954, 6 pages.
(Continued)

*Primary Examiner* — Ilwoo Park
(74) *Attorney, Agent, or Firm* — The Farrell Law Firm, P.C.

(57) ABSTRACT

Disclosed is an electronic device including a first communication circuit that perform communication by using a first communication protocol, and a processor electrically connected to the first communication circuit, wherein the processor activates the first communication circuit based on a predetermined mutual operation, sets an operating mode of the electronic device based on at least part of the activation of the first communication circuit, and operates a universal serial bus (USB) host controller through a switching circuit based on the set operating mode.

15 Claims, 8 Drawing Sheets

(51) Int. Cl.
  *G06F 9/451*    (2018.01)
  *G06F 9/4401*   (2018.01)
  *G06F 3/14*     (2006.01)
  *H02J 50/80*    (2016.01)
  *H02J 50/10*    (2016.01)
  *G06F 13/40*    (2006.01)

(56) References Cited

U.S. PATENT DOCUMENTS

| | | | |
|---|---|---|---|
| 8,677,029 B2 | 3/2014 | Raveendran et al. | |
| 8,964,783 B2 | 2/2015 | Huang et al. | |
| 9,065,876 B2 | 6/2015 | Huang et al. | |
| 2005/0185364 A1 | 8/2005 | Bell et al. | |
| 2009/0006686 A1* | 1/2009 | Kimura | G06F 13/4295 710/106 |
| 2009/0227282 A1* | 9/2009 | Miyabayashi | H04L 63/0492 455/552.1 |
| 2010/0138572 A1 | 6/2010 | Rofougaran | |
| 2010/0194981 A1 | 8/2010 | Hardacker et al. | |
| 2010/0318709 A1 | 12/2010 | Bell et al. | |
| 2011/0064023 A1* | 3/2011 | Yamamoto | H04W 72/048 370/328 |
| 2013/0002949 A1 | 1/2013 | Raveendran et al. | |
| 2013/0003621 A1 | 1/2013 | Huang et al. | |
| 2013/0003622 A1 | 1/2013 | Huang et al. | |
| 2013/0003623 A1 | 1/2013 | Raveendran et al. | |
| 2013/0003624 A1 | 1/2013 | Huang et al. | |
| 2013/0009873 A1 | 1/2013 | Huang et al. | |
| 2013/0009887 A1 | 1/2013 | Huang et al. | |
| 2013/0009996 A1 | 1/2013 | Raveendran et al. | |
| 2013/0013318 A1 | 1/2013 | Huang et al. | |
| 2013/0054815 A1 | 2/2013 | Chang et al. | |
| 2013/0167040 A1 | 6/2013 | Lee et al. | |
| 2014/0120845 A1 | 5/2014 | Laskar | |
| 2014/0120848 A1 | 5/2014 | Laskar | |
| 2014/0120853 A1 | 5/2014 | Laskar | |
| 2014/0122756 A1 | 5/2014 | Laskar | |
| 2014/0229326 A1* | 8/2014 | Carpenter | G06Q 30/06 705/26.7 |
| 2014/0235164 A1* | 8/2014 | Vaucher | H04B 5/0031 455/41.1 |
| 2014/0245036 A1 | 8/2014 | Oishi | |

OTHER PUBLICATIONS

International Search Report dated Aug. 4, 2016 issued in counterpart application No. PCT/KR2016/003934, 12 pages.
European Search Report dated Jan. 22, 2018 issued in counterpart application No. 16165564.2-1224, 5 pages.

* cited by examiner

ELECTRONIC DEVICE AND METHOD FOR PERFORMING HYBRID COMMUNICATION WITH EXTERNAL ELECTRONIC DEVICE

PRIORITY

This application claims priority under 35 U.S.C. §119(a) to a Korean Patent Application filed in the Korean Intellectual Property Office on Apr. 15, 2015 and assigned Serial No. 10-2015-0053051, the contents of which are incorporated herein by reference.

BACKGROUND

1. Field of the Disclosure

The present disclosure relates generally to an electronic device, and more particularly, to a method of the electronic device for performing hybrid communication with an external electronic device.

2. Description of the Related Art

With the development of information and communication technologies, network equipment such as base stations are now omnipresent, allowing users of electronic devices to freely use networks almost anywhere in the country and abroad.

Electronic devices such as smartphones provide various functions in addition to call functions, such as Internet access, music or video playback, and picture and video capturing using an image sensor.

Since such electronic devices have small screens of about 4 to 10 inches, a mirroring technique for outputting content from the display of a smartphone to an external display device connected to the smartphone may be used. However, conventional mirroring techniques usually require complex or inconvenient setting procedure for user.

Accordingly, there is a need in the art for a method of conveniently facilitating such a mirroring technique between an electronic device and an external electronic device.

SUMMARY

The present disclosure has been made to address the above-mentioned problems and disadvantages, and to provide at least the advantages described below.

Accordingly, an aspect of the present disclosure is to provide an electronic device and method of the electronic device for performing hybrid communication with an external electronic device.

In accordance with an aspect of the present disclosure, an electronic device includes a first communication circuit that performs communication by using a first communication protocol, and a processor electrically connected to the first communication circuit, wherein the processor activates the first communication circuit based on a predetermined mutual operation between the electronic device and an external electronic device, sets an operating mode of the electronic device based on at least the activation of the first communication circuit, and operates a universal serial bus (USB) host controller through a switching circuit based on the set operating mode.

In accordance with another aspect of the present disclosure, an external electronic device includes a first communication circuit that performs a first communication by using a first communication protocol, a second communication circuit that performs a second communication by using a second communication protocol, and a processor electrically connected to the first communication circuit and the second communication circuit, wherein the processor requests an electronic device to activate the second communication circuit through the first communication circuit, and receives, from the electronic device through the activated second communication circuit, data to be provided from the electronic device to an output device connected to the external electronic device.

In accordance with another aspect of the present disclosure, a method performed in an electronic device includes activating a first communication circuit based on a predetermined mutual operation with an external electronic device, setting an operating mode of the electronic device based on at least part of the activation of the first communication circuit, and operating a USB host controller through a switching circuit based on the set operating mode.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION OF EMBODIMENTS OF THE DISCLOSURE

Figure 1:
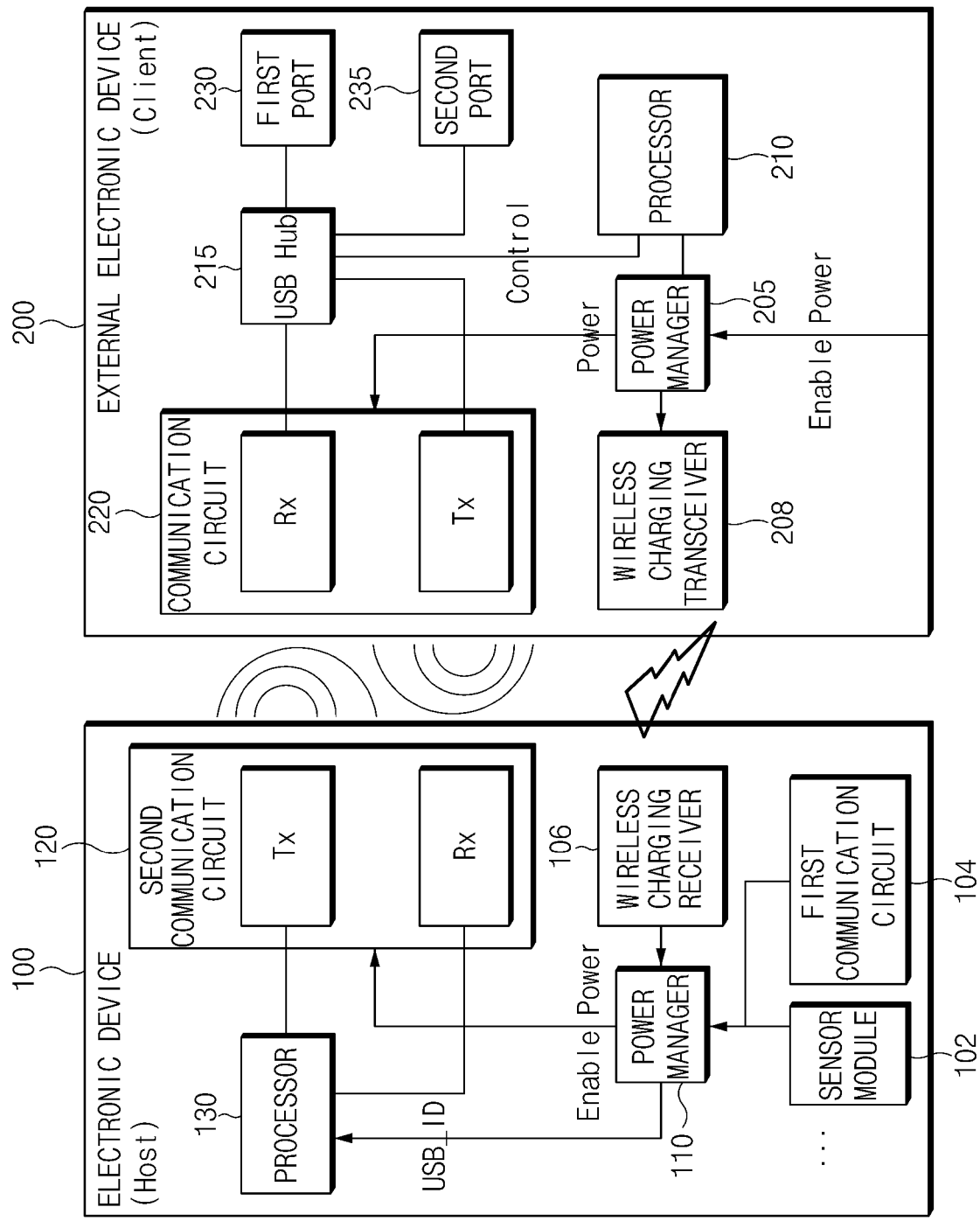
FIG. 1 is a block diagram of an electronic device and an external electronic device according to an embodiment of the present disclosure.

Hereinafter, embodiments of the present disclosure are described with reference to the accompanying drawings. However, the present disclosure is not limited to a specific embodiment and it should be understood that the present disclosure covers all the modifications, equivalents, and/or alternatives of this disclosure provided they come within the scope of the appended claims and their equivalents. In the descriptions of the drawings, like reference numerals refer to like elements. A detailed description of known functions and/or configurations will be omitted for the sake of clarity and conciseness.

The terms "include," "comprise," and "have", "may include," "may comprise" and "may have" used herein indicate disclosed functions, operations, or existence of elements but do not exclude other functions, operations or elements.

For instance, the expressions "A or B", or "at least one of A or/and B" may indicate include A, B, or both A and B. For instance, the expressions "A or B", or "at least one of A or/and B" may indicate (1) at least one A, (2) at least one B, or (3) both at least one A and at least one B.

Terms such as "1st", "2nd", "first", and "second" used herein may modify various elements of embodiments of the present disclosure, but do not limit the elements. For instance, "a first user device" and "a second user device" may indicate different users regardless of the order or importance. For example, a first component may be referred to as a second component and vice-versa without departing from the scope of the present disclosure.

Herein, it will be understood that when a component, such as a first component, is referred to as being "operatively or communicatively coupled with/to" or "connected to" another component, such as a second component, the first component may be directly connected to the second component or connected through another component, such as a third component. It will be further understood that when the first component is referred to as being "directly connected to" or "directly accesses" the second component, the third component does not exist between the first and second components.

The expression "that" used in embodiments of the present disclosure may be interchangeably used with "suitable for", "having the capacity to", "designed to", "adapted to", "made to", or "capable of" according to the situation, for example. The term "that" may not necessarily indicate "specifically designed to" in terms of hardware. Instead, the expression "a device that" in some situations may indicate that the device and another device or part are "capable of". For example, "a processor that perform A, B, and C" in a phrase may indicate a dedicated processor, such as an embedded processor, for performing a corresponding operation or a generic-purpose processor, such as a central processing unit (CPU) or application processor for performing corresponding operations by executing at least one software program stored in a memory device.

Terms used in embodiments of the present disclosure are not intended to limit the scope of other embodiments. The terms of a singular form may also include plural forms unless they have a clearly different meaning in the context. Unless otherwise indicated herein, all the terms used herein, which include technical or scientific terms, may have the same meaning that is generally understood by a person skilled in the art. The dictionary terms should be considered to have the same meaning as the contextual meaning of the related art, and, unless clearly defined herein, should not be understood abnormally or as having an excessively formal meaning. Even the terms defined in this specification cannot be interpreted as excluding embodiments of the present disclosure.

Herein, electronic devices may include at least one of smartphones, tablet personal computers (PCs), mobile phones, video phones, electronic book (e-book) readers, desktop PCs, laptop PCs, netbook computers, workstation servers, personal digital assistants (PDAs), portable multimedia player (PMPs), motion pictures experts group (MPEG) layer audio 3 (MP3) players, mobile medical devices, cameras, and wearable devices, such as smart glasses, head-mounted-devices (HMDs), electronic apparel, electronic bracelets, electronic necklaces, electronic appcessories, electronic tattoos, smart mirrors, and smart watches.

According to some embodiments of the present disclosure, an electronic device may be smart home appliances such as televisions, digital video disk (DVD) players, audio players, refrigerators, air conditioners, cleaners, ovens, microwave ovens, washing machines, air cleaners, set-top boxes, home automation control panels, security control panels, TV boxes, such as Samsung HomeSync™, Apple TV™ or Google TV™, game consoles, such as Xbox™ and PlayStation™, electronic dictionaries, electronic keys, camcorders, and electronic picture frames.

According to some embodiments of the present disclosure, an electronic device may include at least one of various medical devices supporting call forwarding service, such as portable measurement devices including but not limited to glucometers, heart rate meters, blood pressure meters, and temperature meters, magnetic resonance angiography (MRA) devices, magnetic resonance imaging (MRI) devices, computed tomography (CT) devices, medical imaging devices, ultrasonic devices, navigation devices, global positioning system (GPS) receivers, event data recorders (EDRs), flight data recorders (FDRs), vehicle infotainment devices, marine electronic equipment such as marine navigation systems and gyro compasses, avionics, security equipment, vehicle head units, industrial or household robots, automated teller machines (ATMs), and point of sales (POS) or Internet of Things (IoT) devices, such as bulbs, various sensors, electric or gas meters, sprinkler systems, fire alarms, thermostats, street lights, toasters, exercise equipment, hot water tanks, heaters, and boilers.

In embodiments of the present disclosure, an electronic device may include at least one of part of furniture or buildings/structures supporting call forwarding service, electronic boards, electronic signature receiving devices, projectors, and various measuring instruments, such as water, electricity, gas, or radio signal measuring instruments. The electronic device may be one of the above-mentioned various devices or a combination thereof, may be flexible, and may include a new type of electronic device to be developed in the future.

The term "user" in this disclosure may refer to a person using an electronic device or a device using an electronic device, such as an artificial intelligence electronic device.

FIG. 1 is a block diagram of an electronic device 100 and an external electronic device 200 according to an embodiment of the present disclosure. Referring to FIG. 1, the electronic device 100 includes a sensor module 102, a wireless charging receiver 106, a power manager 110, a second communication circuit 120, and a processor 130. The external electronic device 200 includes a power manager 205, a wireless charging transceiver 208, a processor 210, a universal serial bus (USB) hub 215, a communication circuit 220, a first port 230, and a second port 235. However, the configurations of the electronic device 100 and the external electronic device 200 are not limited thereto, and various modifications are possible. For example, the electronic device 100 or the external electronic device 200 may further include a user interface for receiving information from a user, and is a physical input device such as a keyboard or a mouse, and may be a graphical user interface (GUI) displayed on the screen of the electronic device 100 or the external electronic device 200.

The first communication circuit 104 and the second communication circuit 120 of the electronic device 100 and the communication circuit 220 of the external electronic device 200 may perform communication by using a wired or wireless communication network. The wireless communication may use long term evolution (LTE), LTE-Advanced (LTE-A), code division multiple access (CDMA), wideband CDMA (WCDMA), universal mobile telecommunications system (UMTS), wireless broadband (WiBro), or global system for mobile communications (GSM) as a cellular communication protocol, for example. The wireless communication may also be short-range communication including at least one of wireless fidelity (Wi-Fi), Bluetooth™, near field communication (NFC), and global positioning system (GPS). The wired communication may be universal serial bus (USB), high definition multimedia interface (HDMI), recommended standard 232 (RS-232), and plain old telephone service (POTS). The network includes a telecommunications network such as local area network (LAN) or wide area network (WAN), the Internet, and a telephone network.

The sensor module 102 detects the approach of the external electronic device 110, such as by using at least one of a Hall sensor, a proximity sensor, and a geomagnetic sensor. However, the sensor module 102 is not limited thereto, and may detect the approach of the external electronic device 110 by using an image sensor or an ultraviolet (UV) sensor, for example.

The first communication module 104 performs communication with the external electronic device 200. The first communication circuit 104 includes a short-range communication module (or circuit) such as a Bluetooth (BT) module, a Bluetooth Low Energy (BLE) module, and a near field communication (NFC) module. The first communication circuit 104 performs communication with the external electronic device 200 through Wi-Fi Direct technology based on a Wi-Fi Direct module in addition to the short-range communication module.

The wireless charging receiver 106 receives power for wireless charging from the external electronic device 200 and delivers the received power to the power manager 110.

The power manager 110 supplies power necessary for operating the components in the electronic device 100 to each component. For example, the power manager 110 supplies power necessary for operating the second communication circuit 120 to the second communication circuit 120. However, the processor 130 may also supply power to the second communication circuit 120.

The second communication circuit 120 performs communication, such as millimeter wave communication, with the external electronic device 200 together with or separately from the first communication circuit 110. The processor 130 may be implemented as a system on chip (SoC) and includes one or more of a central processing unit (CPU), a graphic processing unit (GPU), an image signal processor, an application processor (AP), a communication processor (CP), and a USB controller. The processor 130 loads and processes instructions or data, which are received from at least one of other components, from a memory, and stores various data in the memory.

When detecting the approach of the external electronic device 200 through the sensor module 102, the processor 130 enables the power manager 110 to supply power to the second communication circuit 120.

When receiving a request for activating the second communication circuit 120 from the external electronic device 200, the processor 130 enables the power manager 110 to supply power to the second communication circuit 120.

Furthermore, when receiving power from the external electronic device 200 through the wireless charging receiver 106, the processor 130 enables the power manager 110 to supply power to the second communication circuit 120.

By using at least one of the above-mentioned methods, the processor 130 enables the power manager 110 to supply power to the second communication circuit 120 and activate the second communication circuit 120.

The processor 130 may set an operating mode of the electronic device 100 based on at least part of the activation of the second communication circuit 120. For example, the processor 130 may set the operating mode based on data, such as a virtual USB_ID value) for setting the operating mode. An operation that the processor 130 determines a virtual USB_ID value may be performed as receiving the virtual USB_ID value from the external electronic device 200 through the first communication circuit 104 or the second communication circuit 120. The processor 130 performs an operation corresponding to the virtual USB_ID value by referring to a virtual USB management table of Table 1 below.

TABLE 1

| USB_ID | 0x0 | 0x1 | 0x2 | 0x3 | 0x10 |
|---|---|---|---|---|---|
| Operation | USB_HOST | USB_DEVICE | MHL | Serial | USB Host & charging |

The virtual USB management table is generated by the processor 130 based on a predetermined software logic, and the virtual USB_ID value has a lower priority than an actual USB ID value. According to an embodiment of the present disclosure, when an actual USB device is connected to the electronic device 100, the virtual USB management table may not be used. However, when there are two or more USB controllers, a first USB controller may be used to control the USB device and a second USB controller may set a USB_ID value to one value in the virtual USB management table.

The processor 130 enables the external electronic device 200 to supply BUS voltage (hereinafter, V_BUS) through the first communication circuit 104 or the second communication circuit 120.

The processor 130 sets a USB path to be connected to the second communication circuit 120 through a switching circuit and operate the electronic device 100 in a USB host controller mode.

According to embodiments of the present disclosure, the electronic device 100 may be set to operate in the USB host controller mode as soon as the second communication circuit 120 is activated.

The processor 130 transmits data to the external electronic device 200 through the activated second communication circuit 120. The transmitted data is provided to an output device connected to the external electronic device 200. The output device includes a display device and an audio device. For example, when the output device is the display device, the transmitted data is displayed through the display device, which may be a liquid crystal display (LCD), a light emitting diode (LED) display, an organic light emitting diode (OLED) display, a microelectromechanical systems (MEMS) display, or an electronic paper display, for example.

According to embodiments of the present disclosure, each of the sensor module 102, the first communication circuit 104, the wireless charging receiver 106, the power manager 110, the second communication circuit 120, and the processor 130 may be implemented using an additional separate module or circuit inside the electronic device 100, or using at least one mutually-integrated component.

Hereinafter, operations performed in the components of the external electronic device 200 will be described. The contents described with reference to the electronic device 100 may be applied to describe a configuration corresponding to the external electronic device 200.

The power manager 205 supplies power necessary for operating the components in the external electronic device 200. Although it is shown in FIG. 1 that the power manager 205 supplies power to only the wireless communication transceiver 208 and the communication circuit 220, the power manager 205 also supplies power to the processor 210 and the USB hug 215.

The wireless charging transceiver 208 receives power from the power manager 205 and wirelessly delivers power to the wireless charging receiver 106 of the electronic device 100. The wireless charging may be performed by using an induced current.

The processor 210 transmits/receives data or signals to/from the electronic device 100 through the communication circuit 220. Although it is shown in FIG. 1 that the communication circuit 220 corresponds to the second communication circuit 120 of the electronic device 100, the communication circuit 220 may further include a function corresponding to a communication protocol used by the first communication circuit 110 of the electronic device 100.

For example, the processor 210 requests the activation of the second communication circuit 120 from the first communication circuit 104 of the electronic device 100 through the communication circuit 220 by using short-range communication such as BT, BLE, and NFC.

The processor 210 receives a request for supplying V_BUS from the first communication circuit 104 or the second communication circuit 120 of the electronic device 100 through the communication circuit 220. In this case, the processor 210 enables the power manager 205 to supply power to the USB hub 215. The power manager 205 supplies power to the communication circuit 220, the first port 230, and the second port 235, which are connected to the USB hub 215, through the USB hub 215. According to embodiments of the present disclosure, the first port 230 is for connecting to LAN and the second port 235 is for connecting to the output device. Hereinafter, the output device will be described as a display device.

The processor 210 receives data to be displayed on the display device through the communication circuit 220. The processor 210 may display the received data on the display device. The data includes a variety of contents, such as background screens, application execution screens, texts, images, videos, icons, symbols, and so on). In this case, the processor 210 converts the data to be outputted to fit the resolution of the display device.

According to embodiments of the present disclosure, each of the power manager 205, the wireless charging transceiver 208, the processor 210, the USB hub 215, the communication circuit 220, the first port 230, and the second port 235 may be implemented using an additional separate module or circuit inside the external electronic device 200 or may be implemented using at least one mutually-integrated component.

Figure 2A:
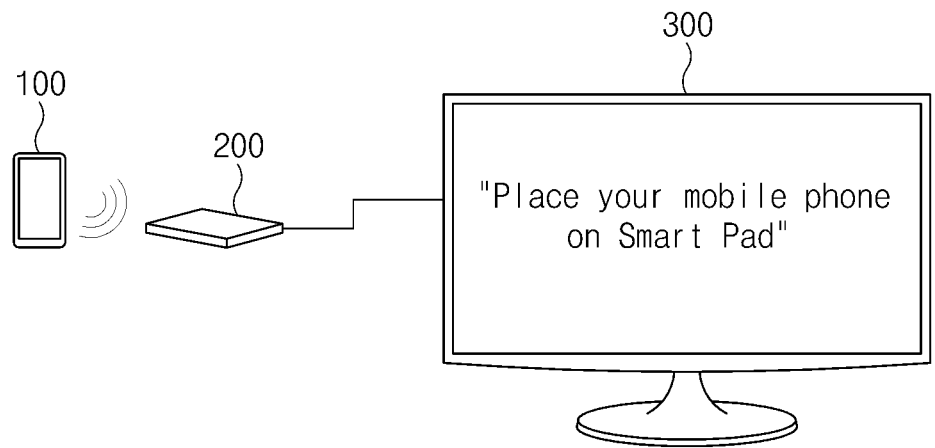
FIGS. 2A and 2B illustrate an access between an electronic device and an external electronic device through a display device according to an embodiment of the present disclosure.
Figure 2B:
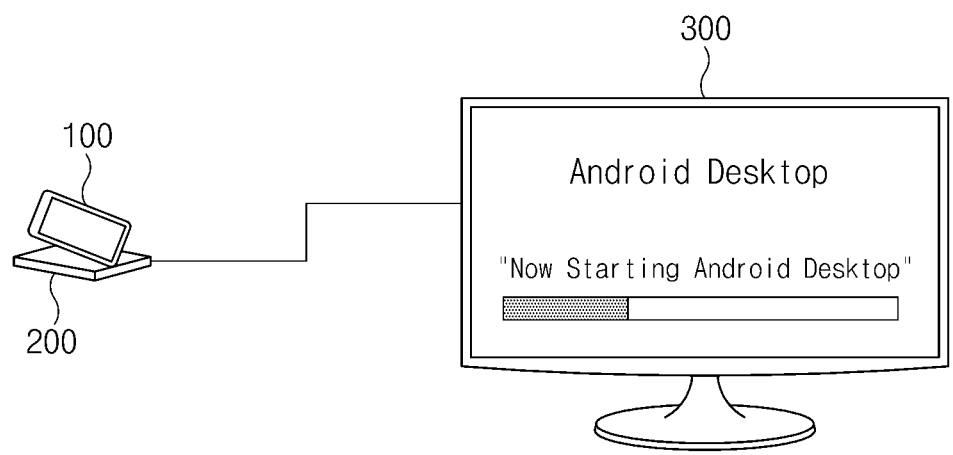

FIGS. 2A and 2B illustrate an access between the electronic device 100 and the external electronic device 200 through a display device 300.

Referring to FIG. 2A, the processor 210 of the external electronic device 200 determines whether the electronic device 100 is near the external electronic device 200 within a certain distance D and based on this, outputs a message 'Place your mobile phone on Smart Pad' to the screen of the display device 300, which is an example of an output device.

The processor 210 determines the proximity of the electronic device 100 through several methods, such as by performing communication with the first communication circuit 104 or the second communication circuit 120 of the electronic device 100 by using the communication circuit 220, by checking a received signal strength indicator (RSSI) or using a least one sensor included in the external electronic device 200. Additionally or alternatively, the processor 130 of the electronic device 100, instead of the external electronic device 200, may directly determine the proximity of the external electronic device 200, and the processor 210 receives a notification that the electronic device 100 is nearby from the electronic device 100 through the communication circuit 220.

Referring to FIG. 2B, when the electronic device 100 is seated on the external electronic device 200, the processor 210 of the external electronic device 200 outputs a message 'Now Starting Android Desktop' to the screen of the display device 300.

Similar to when determining the proximity of the electronic device 100 in FIG. 2A, the processor 210 determines whether the electronic device 100 is seated, directly or indirectly by the electronic device 100, through the wireless charging transceiver 208.

The present disclosure is not limited to the outputted message shown in FIGS. 2A and 2B, and the message may be differently outputted according to the operating system (OS) of the electronic device 100 or the external electronic device 200, or a user setting.

Figure 3:
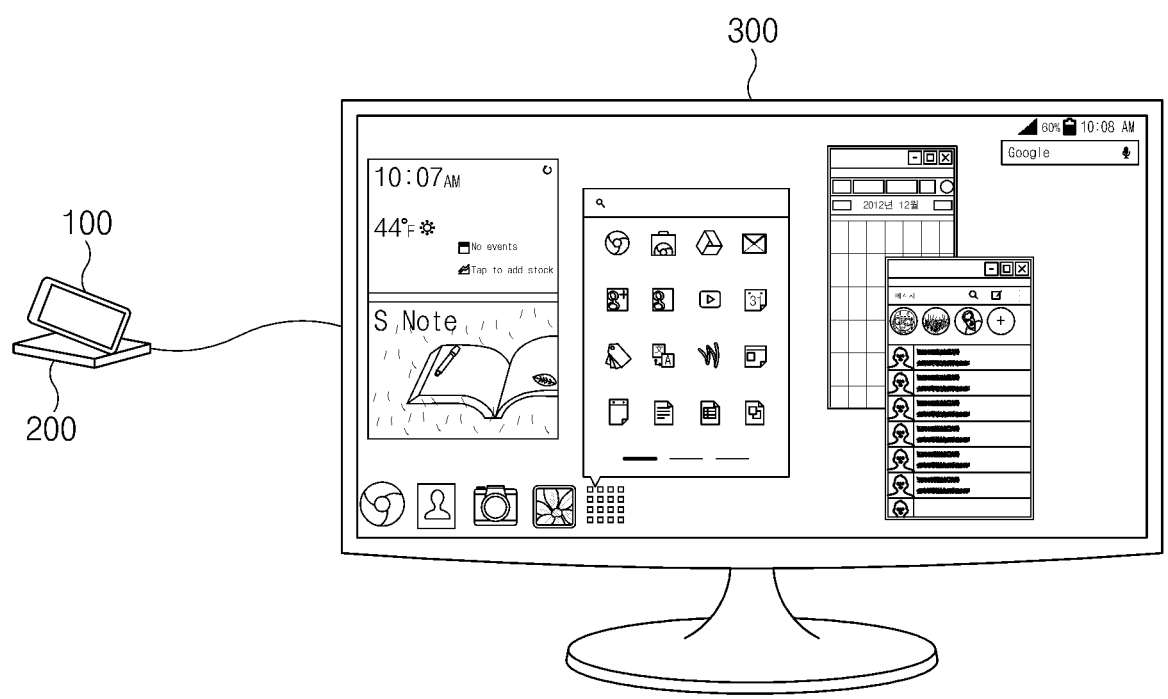
FIG. 3 illustrates an operation of displaying, on a display device, a screen to be displayed or being displayed on the screen of an electronic device according to an embodiment of the present disclosure.

FIG. 3 illustrates an operation of the external electronic device 200 to display, on the display device 300, a screen to be displayed or being displayed on the screen of the electronic device 100 according to an embodiment of the present disclosure.

The processor 130 of the electronic device 100 transmits application data, such as a home screen or widget application, to be displayed or being displayed on the screen of the electronic device 100, to the external electronic device 200 through the second communication circuit 120, and transmits the data of an application being executed on the background of the electronic device 100 to the external electronic device 200 through the second communication circuit 120.

The processor 210 of the external electronic device 200 receives the application data from the electronic device 100 through the communication circuit 220, and displays the received data on the screen of the display device 300.

According to embodiments of the present disclosure, the processor 210 converts the received data to fit the screen of the display device 300, and a screen displayed on the screen of the display device 300 may be the converted data. Referring to FIG. 3, the processor 210 simultaneously converts the received data to display a home screen, an application list, and at least one application screen on the display device 300.

Figure 4:
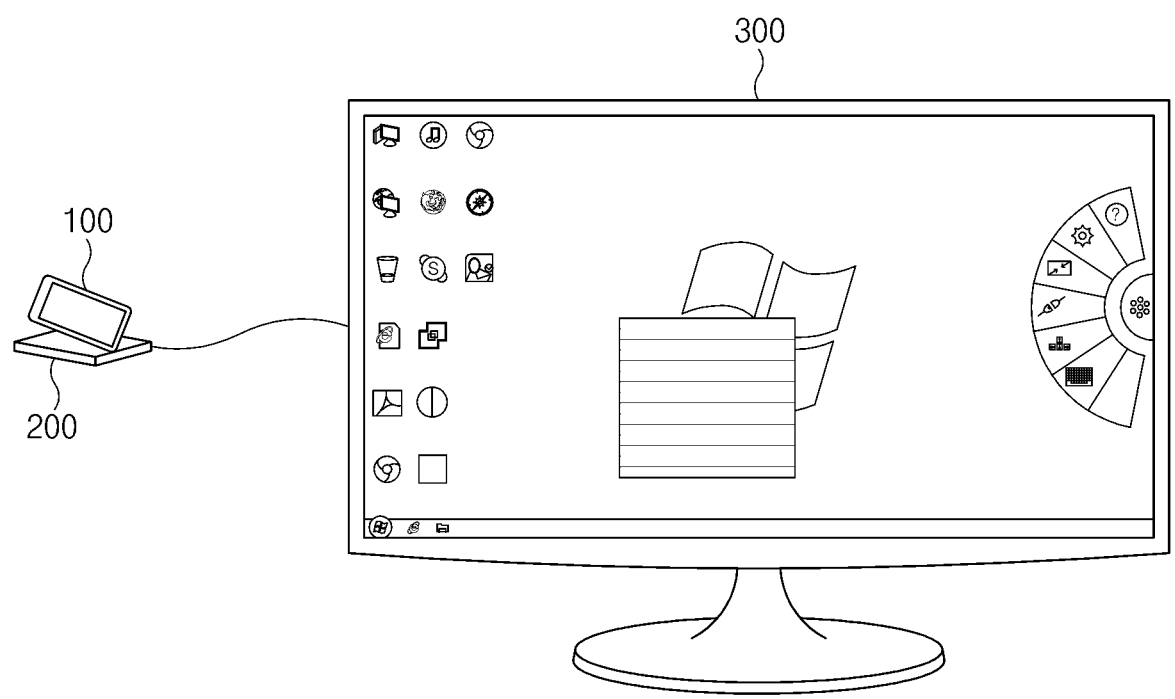
FIG. 4 illustrates an operation of displaying, on a display device, a screen to be displayed or being displayed on the screen of an electronic device according to another embodiment of the present disclosure.

FIG. 4 illustrates an operation of the external electronic device 200 to display, on the display device 300, a screen to be displayed or being displayed on the screen of the electronic device 100 according to another embodiment of the present disclosure.

Similar to FIG. 3, the processor 210 of the external electronic device 200 receives data from the electronic device 100 through the communication circuit 220, and converts the received data in order to display the converted data on the screen of the display device 300.

The processor 210 of the external electronic device 200 converts data received from the electronic device 100 into an Android OS format in FIG. 3, and converts the received data into a Windows OS format in FIG. 4.

Figure 5:
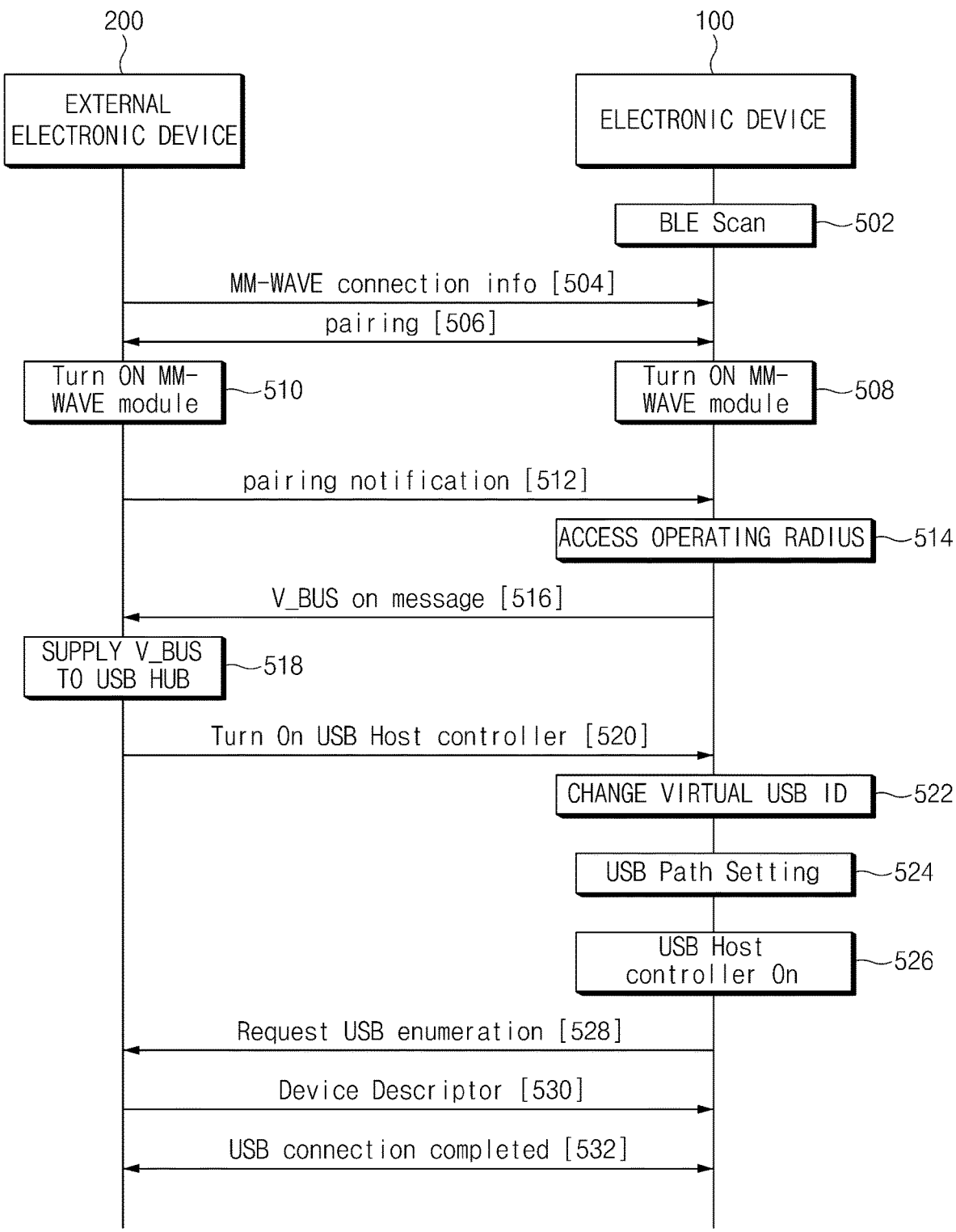
FIG. 5 illustrates a connection method between an electronic device and an external electronic device according to an embodiment of the present disclosure.

FIG. 5 illustrates a connection method between the electronic device 100 and the external electronic device 200 according to an embodiment of the present disclosure.

In operation 502, the electronic device 100 scans BLE broadcasting by activating a BLE function. In operation 504, the electronic device 100 receives millimeter (MM) wave communication connection information from the external electronic device 200 based on a scanning result in operation 502. The electronic device 100 receives a request for millimeter wave connection together with millimeter wave communication connection information from the external electronic device 200, and the millimeter communication connection information includes identification information necessary for the millimeter wave connection.

The electronic device 100 according to embodiments of the present disclosure is not limited to using a BLE function, and may receive millimeter wave connection information from the external electronic device 200 by using various short-range communications such as NFC, radio frequency identification (RFID), and BT.

In operation 506, the electronic device 100 and the external electronic device 200 are mutually paired, such as by BT pairing.

In operation 508 and operation 510, an MM wave communication module of each of the electronic device 100 and the external electronic device 200 is activated. Operation 508 and operation 510 may be performed simultaneously or in succession.

In operation 512, the electronic device 100 receives a notification that pairing is successful from the external electronic device 200.

In operation 514, the electronic device 100 accesses the inside of an operating radius of the external electronic device 200, and may be seated on the external electronic device 200.

In operation 516, the electronic device 100 transmits a message or signal for supplying BUS voltage to the external electronic device 200. In operation 518, the external electronic device 200 supplies the BUS voltage to a USB hub in response to the message or signal received in operation 516.

In operation 520, the external electronic device 200 requests the electronic device 100 to operate in a USB host controller mode. The request includes a virtual USB_ID value corresponding to a virtual USB management table to allow the electronic device 100 to operate in a USB host controller mode.

In operation 522, the electronic device 100 applies a virtual USB_ID value received in operation 520, and in operation 524, sets a USB path to be directed to the second communication circuit 120 through a switching circuit. Through this, in operation 526, the electronic device 100 determines its operating mode as a USB host controller mode. Operation 522 and operation 524 may be performed simultaneously or in succession.

In operation 528, the electronic device 100 requests information on USB enumeration on at least one output device connected to the external electronic device 200, from the external electronic device 200, and in operation 530, the external electronic device 200 transmits device descriptor or device identifier information on the at least one output device to the electronic device 100.

In operation 532, the electronic device 100 and the external electronic device 200 complete mutual USB connection.

Figure 6:
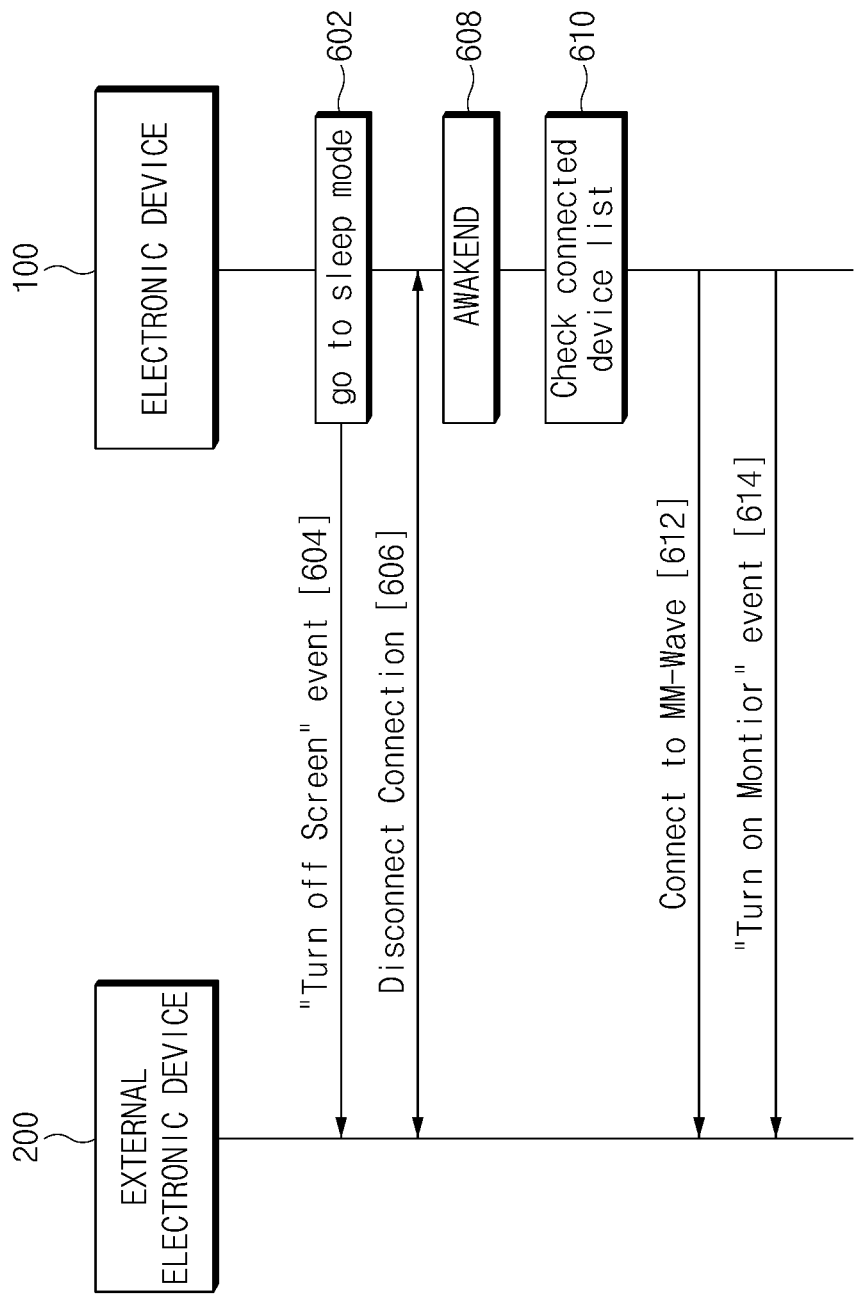
FIG. 6 illustrates a connection state between an electronic device and an external electronic device when an electronic device re-awakens after entering a sleep mode according to an embodiment of the present disclosure.

FIG. 6 illustrates a connection state between the electronic device 100 and the external electronic device 200 when the electronic device 100 re-awakens after entering a sleep mode according to an embodiment of the present disclosure. Hereinafter, operations 602 to 614 are performed after millimeter wave communication is connected between the electronic device 100 and the external electronic device 200.

In operation 602, the electronic device 100 enters a sleep mode when there is no user input on the electronic device 100 for a predetermined time. Alternatively, the sleep mode may be entered when a button for allowing the electronic device 100 to enter a sleep mode is pressed.

In operation 604, the electronic device 100 transmits, to the external electronic device 200, an instruction for turning off the screen of a display device that is one example of an output device connected to the external electronic device 200.

By the sleep mode entry in operation 602, in operation 606, a connection between the electronic device 100 and the external electronic device 200 may be released.

In operation 608, the sleep mode of the electronic device 100 is released, such as through an operation for pressing the power button of the electronic device 100. Operation 608 is performed a long period of time after operation 606 is performed.

In operation 610, the electronic device 100 checks a list of external devices connected to the electronic device 100. In the list, the external electronic device 200 is included as a USB client.

The electronic device 100 requests millimeter wave communication connection from the external electronic device 200 in operation 612, and transmits an instruction for turning on the screen of the display device to the external electronic device 200 in operation 614.

Figure 7:
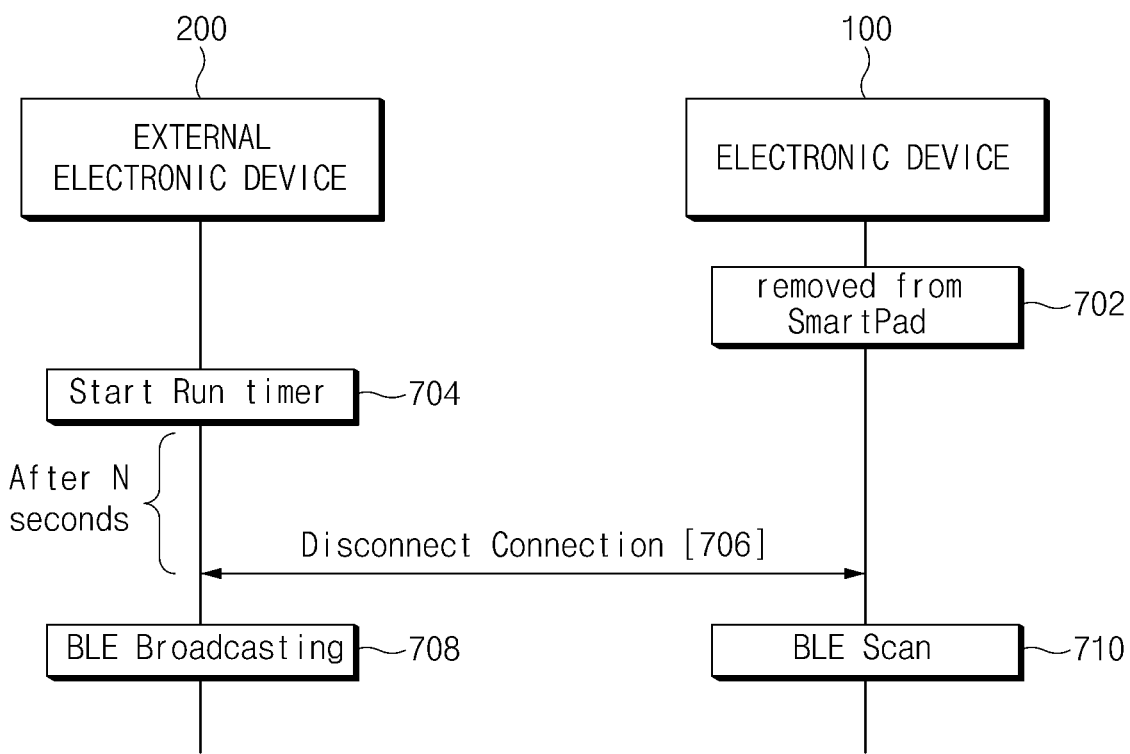
FIG. 7 illustrates a connection state between an electronic device and an external electronic device when the electronic device is away from the external electronic device according to an embodiment of the present disclosure.

FIG. 7 illustrates a connection state between an electronic device and an external electronic device when the electronic device is away from the external electronic device according to an embodiment of the present disclosure. Hereinafter, operations 702 to 710 are performed after millimeter wave communication is connected between the electronic device 100 and the external electronic device 200.

The electronic device 100 is separated from the external electronic device 200 in operation 702, and drives a timer in operation 704. When a predetermined time such as N seconds elapses, a connection between the electronic device 100 and the external electronic device 200 is released in operation 706.

In operation 708, the external electronic device 200 performs BLE broadcasting. In operation 710, the electronic device 100 performs BLE scanning.

Figure 8:
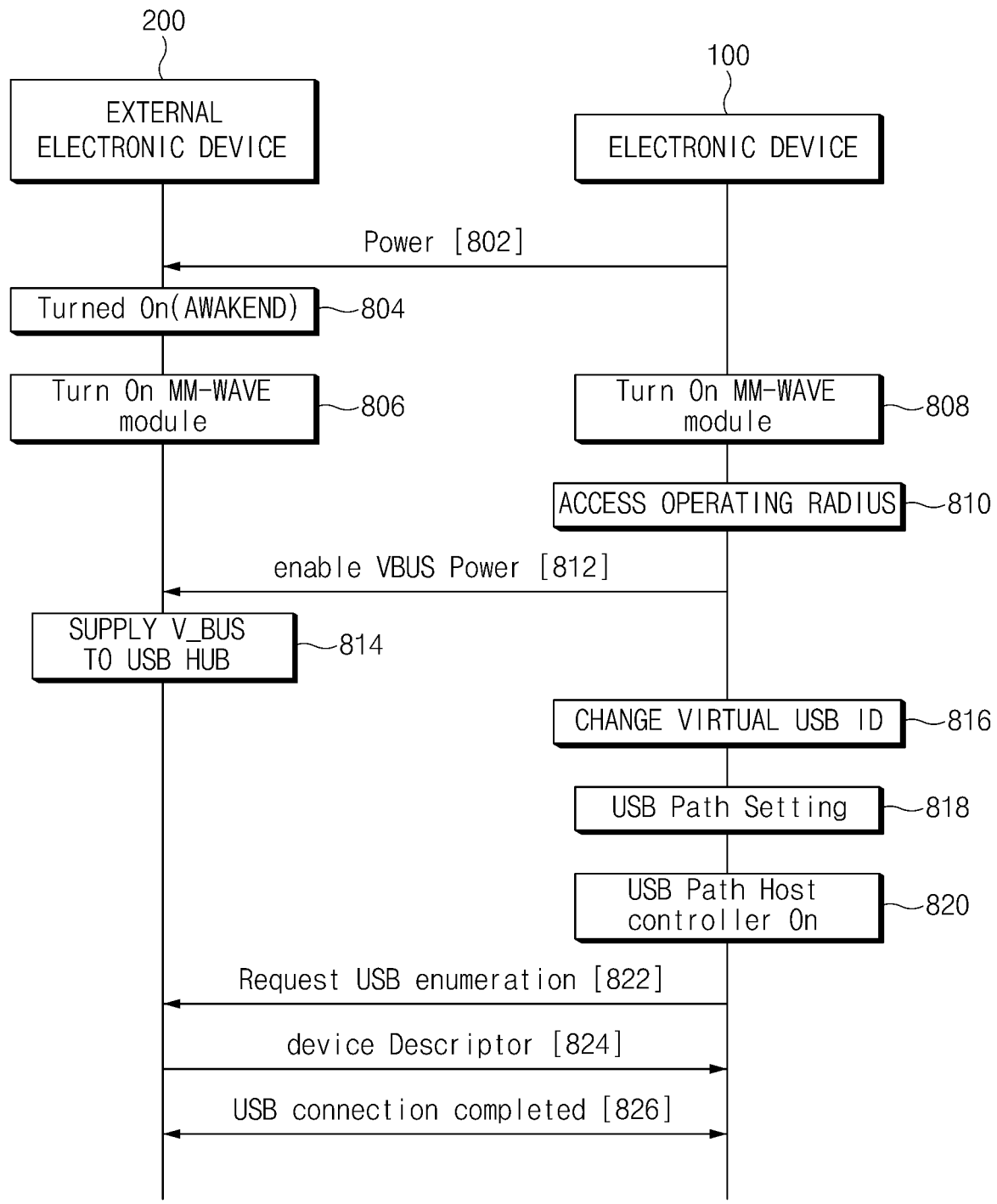
FIG. 8 illustrates a connection method between an electronic device and an external electronic device according to another embodiment of the present disclosure.

FIG. 8 illustrates a connection method between the electronic device 100 and the external electronic device 200 according to another embodiment of the present disclosure.

In operation 802, the electronic device 100 supplies power to the external electronic device 200. In the embodiment of FIG. 8, the external electronic device 200 receives power from the electronic device 100, and may be a wearable device.

In operation 804, the external electronic device 200 is turned on by receiving the power supplied in operation 802.

In operations 806 and 808, each of the electronic device 100 and the external electronic device 200 activates a millimeter wave communication module. Operations 806 and 808 may be performed simultaneously or in succession.

In operation 810, the electronic device 100 accesses the inside of an operating radius of the external electronic device 200.

In operation 812, the electronic device 100 transmits a message or signal for supplying BUS voltage to the external electronic device 200. In operation 814, the external electronic device 200 supplies the BUS voltage to a USB hub in response to the message or signal received in operation 812.

In operation 816, the electronic device 100 applies a virtual USB_ID value and in operation 818, sets a USB path to be directed to the second communication circuit 120 through a switching circuit. Through this, in operation 820, the electronic device 100 determines its operating mode as a USB host controller mode.

In operation 822, the electronic device 100 requests information on at least one output device connected to the external electronic device 200, for example the electronic device 100 may request USB enumeration in operation 822, from the external electronic device 200, and in operation 824, the external electronic device 200 transmits the information (e.g., device descriptor) on at least one output device to the electronic device 100.

In operation 826, the electronic device 100 and the external electronic device 200 complete mutual USB connection.

According to embodiments of the present disclosure, an electronic device and method overcome a limited display size by displaying a screen to be displayed on the display of the electronic device through an output device connected to an external electronic device.

According to embodiments of the present disclosure, an electronic device and an external electronic device determine a mutual proximity state, and based on a determination result, activate each millimeter wave communication circuit. By using millimeter wave communication, a user may conveniently view contents being executed on an electronic device through another output device without additional setting.

In order for the electronic device to operate as a host device and the external electronic device to operate as a client device, since the electronic device uses a virtual USB management table, the external electronic device may be controlled through the electronic device without an additional configuration.

In this instance, instead of displaying a screen to be displayed on the display of the electronic device on the output device simply through mirroring, a processor of an external electronic device conveniently converts the screen.

The term "module" used in embodiments of the present disclosure may indicate a unit including a combination of at least one of hardware, software, and firmware. The terms "module", "unit", "logic", "logical block", "component", and "circuit" may be interchangeably used. A "module" may be a minimum unit or part of an integrally configured component. A "module" may be a minimum unit performing at least one function or part thereof. A "circuit" may be mechanically or electronically implemented and includes at least one of an application-specific integrated circuit (ASIC) chip performing certain operations, field-programmable gate arrays (FPGAs), or a programmable-logic device, all of which are known or to be developed in the future.

According to embodiments of the present disclosure, at least part of a device or a method may be implemented using an instruction stored in computer-readable storage media. When at least one processor executes an instruction, the processor performs a function corresponding to the instruction.

The non-transitory computer-readable storage media includes hard disks, floppy disks, magnetic media, such as magnetic tape), optical media, such as CD-ROM, and DVD, magneto-optical media, such as a floptical disk, and hardware devices, such as read-only memory (ROM), random access memory (RAM), or flash memory. A program instruction includes high-level language code executable by a computer using an interpreter in addition to machine code created by a complier. The hardware device may be that operate as at least one software module to perform an operation of embodiments of the present disclosure and vice versa.

A module or a programming module according to embodiments of the present disclosure includes at least one of the above-mentioned components, may not include some of the above-mentioned components, or may further include another component. Operations performed by a module, a programming module, or other components according to embodiments of the present disclosure may be executed through a sequential, parallel, repetitive or heuristic method. Some operations may be executed in a different order or may be omitted, and other operations may be added.

The embodiments disclosed in this specification are suggested for the description and understanding of technical content but do not limit the range of the present disclosure. Accordingly, the range of the present disclosure should be interpreted as including all modifications or various other embodiments based on the technical aspects of the present disclosure.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a first communication circuit that performs wireless communication;
   a second communication circuit that performs millimeter wave communication;
   a universal serial bus (USB) host controller;
   a switching circuit;
   a memory storing instructions; and
   at least one processor adapted to execute the stored instructions to:
   control the first communication circuit to perform a predetermined mutual operation between the electronic device and an external electronic device using the wireless communication,
   activate the second communication circuit based on the predetermined mutual operation,
   control the first communication circuit or the second communication circuit to receive setting data for setting an operating mode, and
   in response to activating the second communication circuit, control the USB host controller to set the operating mode of the electronic device as a host controller mode based on the received setting data by setting a USB path to be directed to the second communication circuit through the switching circuit, and control the second communication circuit to transmit data to the external device using the millimeter wave communication, wherein the received data is based on a virtual USB management table, and wherein the at least one processor is further adapted to execute the stored instructions to the USB host controller to set the operating mode of the electronic device by setting the virtual USB management table to have a lower priority than a priority of an actual USB management table.

2. The electronic device of claim 1, wherein the transmitted data is provided to an output device connected to the external electronic device.

3. The electronic device of claim 1, wherein the predetermined mutual operation comprises receiving, through the first communication circuit, a request for activating the second communication circuit from the external electronic device.

4. The electronic device of claim 3, wherein the wireless communication performed by the first communication circuit includes at least one of BluetoothTM, BluetoothTM low energy, and near field communication (NFC).

5. The electronic device of claim 1, wherein the predetermined mutual operation comprises receiving, by the first communication circuit, power for wireless charging from the external electronic device.

6. The electronic device of claim 1, wherein the at least one processor is further adapted to execute the stored instructions to control the first communication circuit or the second communication circuit to transmit, to the external electronic device, a signal for supplying power to a USB of the external electronic device.

7. An external electronic device, comprising:
a first communication circuit that performs wireless communication;
a second communication circuit that performs millimeter wave communication; and
at least one processor configured to:
control the first communication circuit or the second communication circuit to transmit, to an electronic device, setting data for setting an operating mode of the electronic device,
control the first communication circuit to request the electronic device to activate a function for the millimeter wave communication at the electronic device using the wireless communication, and
control the second communication circuit to receive, from the electronic device, data to be provided from the electronic device to an output device connected to the external electronic device using the millimeter wave communication,
wherein the setting data is based on a virtual universal serial bus (USB) management table, and
wherein the electronic device sets the operating mode of the electronic device by setting the virtual USB management table to have a lower priority than a priority of an actual USB management table.

8. The external electronic device of claim 7, wherein the wireless communication performed by the first communication circuit includes at least one of BluetoothTM, BluetoothTM low energy, and near field communication (NFC).

9. The external electronic device of claim 7, wherein the at least one processor is further configured to transmit, to the electronic device, an operating mode value of the electronic device for operating a universal serial bus (USB) host controller of the electronic device, through the first communication circuit or the second communication circuit.

10. The external electronic device of claim 7, wherein the at least one processor is further configured to receive, from the electronic device, a request for supplying power to a universal serial bus (USB) connected to the output device, through the first communication circuit or the second communication circuit.

11. The external electronic device of claim 7, wherein the at least one processor is further configured to control the first communication circuit to broadcast a signal for activating for the millimeter wave communication at the electronic device.

12. A method performed in an electronic device, the method comprising:
performing, by the electronic device, a predetermined mutual operation between the electronic device and an external electronic device through wireless communication using a first communication circuit of the electronic device;
activating the second communication circuit of the electronic device based on the predetermined mutual operation, the second communication circuit supporting millimeter wave communication
receiving setting data for setting an operating mode through the first communication circuit or the second communication circuit; and
in response to activating the second communication circuit, setting the operating mode of the electronic device as a host controller mode based on the received setting data by setting a USB path to be directed to the second communication circuit through a switching circuit, and transmitting data to the external device through the millimeter wave communication using the second communication circuit of the electronic device,,
wherein the received setting data is based on a virtual USB management table, and
wherein setting the operating mode of the electronic device further comprises setting the virtual USB management table to have a lower priority than a priority of an actual USB management table.

13. The method of claim 12, wherein the predetermined mutual operation comprises receiving a request for activating the second communication circuit from the external electronic device, through the first communication circuit.

14. The method of claim 12, wherein the predetermined mutual operation comprises receiving power for wireless charging from the external electronic device.

15. The method of claim 12, wherein the transmitted data is provided to an output device connected to the external electronic device.

* * * * *